United States Patent Office 3,410,680
Patented Nov. 12, 1968

3,410,680
METHOD OF PRODUCING ALUMINUM
Volker Sparwald, Stuettgen-Neuss, Germany, assignor to Vereinigte Aluminium-Werke Aktiengesellschaft, Bonn, Germany
No Drawing. Filed Feb. 10, 1966, Ser. No. 526,969
Claims priority, application Germany, Feb. 11, 1965, V 23,611
10 Claims. (Cl. 75—68)

The present invention relates to a method of producing aluminum and, more particularly, the present invention is concerned with the recovery of aluminum from a reaction product obtained by melting together aluminum oxide-containing material and carbonaceous material.

Such reaction products are known and methods of producing the same are described, for instance, in U.S. Patents Nos. 2,892,961 and 2,974,032.

These reaction products consist essentially of metallic aluminum, aluminum carbide and aluminum oxide. The total aluminum content of these reaction products generally is between 20 and 80% by weight and in most cases higher than 60% by weight.

Certain difficulties arise in the recovery of aluminum from such reaction products, particularly with respect to the removal of solid aluminum carbide and solid aluminum oxide.

The reaction products which form the starting material of the process of the present invention are solid even at temperatures above the melting point of aluminum and notwithstanding the high content of metallic aluminum which may exceed 70% by weight.

It appears that the metallic aluminum of the reaction product is intimately joined to the other constituents of the reaction product, primarily aluminum carbide $Al_4C_3$. Microscopic investigation at room temperature shows that grains or granules of solid metallic aluminum are completely surrounded by platelets of aluminum carbide. At temperatures of between about 800° and 1800° C., i.e., temperatures above the melting point of the aluminum, the aluminum in the reaction product is in liquid condition whereas the other constituents of the reaction product, primarily aluminum carbide, are solid at least as long as the temperature remains below 1800° C. However, due to the fact that droplets of liquid aluminum are completely surrounded by solid aluminum carbide, the molten aluminum will not separate and the reaction product, even at temperatures above 800° C. will appear solid, possibly comparable in appearance with that of very small honeyfilled honeycombs, inasmuch as a liquid constituent is encapsulated in a more or less cellular structure.

It is an object of the present invention to separate or recover metallic aluminum from the above-described reaction product in a particularly simple, effective and economical manner.

Other objects and advantages of the present invention will become apparent from a further reading of the description and of the appended claims.

With the above and other objects in view, the present invention contemplates a method of recovering aluminum from the reaction product obtained by melting alumina-containing material with carbonaceous material, the reaction product consisting essentially of a mixture of metallic aluminum, aluminum carbide and alumina, the steps of grinding the mixture at a temperature above the melting point of aluminum and below about 1800° C., at which temperature the aluminum will be liquid and the aluminum carbide and alumina will be in solid form, so as to comminute the aluminum carbide and the alumina, and blowing through the thus formed mixture of comminuted aluminum carbide, comminuted alumina and liquid aluminum at a temperature above the melting point of aluminum a stream of gas which is inert with respect to the aluminum, in such a manner as to substantially carry along in the gas stream the solid comminuted alumina and aluminum carbide and thereby to separate the molten aluminum from the solid constituents of the mixture.

Preferably, the blowing of inert gas through the reaction product is carried out simultaneously with the grinding of the same.

It has been proposed to cool the freshly formed reaction product to a temperature below 1800° C., however, above the melting point of aluminum and to subject the more or less honeycomb-like structure within this temperature range to hot grinding, preferably in a ball mill, whereby the metallic aluminum will be freed from the cells formed predominantly of solid aluminum carbide, and the aluminum carbide, as well as other solid constituents of the reaction mixture, particularly aluminum oxide, will be comminuted.

It has been suggested to then cool the mixture to below the melting point of aluminum and, in various manners, to separate the solid aluminum from the residual solid portions of the mixture.

According to the present invention, the ground reaction product formed in the ball mill or the like is separated above the melting point of aluminum into the solid comminuted residual portions such as aluminum carbide and aluminum oxide on the one hand, and the molten metallic aluminum on the other hand. This results in a substantial purification of the metallic aluminum.

The separation of liquid metallic aluminum from solid constituents of the reaction product is accomplished by sifting the ground mass, preferably at its grinding temperature and in any event at a temperature above the melting point of aluminum, by introducing into the same and passing therethrough a gas which is inert with respect to metallic aluminum, in such a manner that the stream of inert gas leaving the molten aluminum will carry along the comminuted solid particles consisting predominantly of aluminum carbide and aluminum oxide, so that molten metallic aluminum is obtained which is substantially free of the above-mentioned impurities.

The reaction product described above may be charged into a ball mill operating with corundum spheres or balls as grinding members and maintaining in the ball mill during operation of the same a temperature of at least 800° C. Grinding is continued until the constituents of the reaction mixture which remain solid at such temperature are comminuted to a particle size which should be less than 1 mm., preferably between about 0.5 and 0.1 mm.

A stream of gas which is inert relative to aluminum, for instance argon, nitrogen, hydrogen or a mixture thereof, is blown into the ball mill and will pick up and carry along the comminuted particulate solid constituents of the reaction mixture, preferably into a cyclone or the like with a filter arranged subsequent thereto so that the solid particles may be recovered. Liquid metallic aluminum remains in the ball mill and may be withdrawn therefrom and further processed in conventional manner.

It is also within the scope of the present invention to carry out the grinding of the reaction product and the separation of solid comminuted constituents from the thus-formed ground mixture in two separate steps, by withdrawing the ground mixture from the mill and carrying out the passage of a stream of gas through the mixture in a separate device, for instance in a cyclone, whereby the temperature of the mixture during the separation of the solid comminuted constituents thereof must be maintained above the melting point of aluminum. Theoretically it would also be possible to withdraw the ground mixture from the ball mill or the like, to allow the mixture to cool and to solidify and thereafter again to heat the mixture to above the melting point of aluminum, prior to passing the inert gas stream therethrough. However, for all practical purposes it would appear more advantageous to carry out the separation of solid particles from the ground reaction mixture without permitting intermediate solidification of the metallic aluminum thereof.

It is desirable to form the inner wall of the ball mill, or of any other device which comes in contact with the molten aluminum, of corundum or other material which, at the operating temperatures, will not react with metallic aluminum.

The following examples are given as illustrative only, without, however, limiting the invention to the specific details of the examples.

EXAMPLE I

A reaction product obtained as described in U.S. Patents 2,829,961 or 2,974,031 or German Patents 913,237 or 1,100,976 and which generally contains a total amount of aluminum of more than 60% by weight and an amount of metallic aluminum which—depending on the reaction conditions—will be at least between 20 and 40% by weight and may be even more, for instance up to about 80% by weight, is introduced into a ball mill operated with corundum spheres or balls as the grinding bodies. Within the ball mill a temperature of about 800° C. is maintained and the reaction product is subjected to grinding therein. While still in the ball mill and while maintaining the grinding temperature, a gas which is inert relative to molten aluminum is blown into the mass within the ball mill at a speed of preferably more than 18 meters per second. The fast flowing stream of gas will carry the finely comminuted solid constituents of the reaction product, i.e., primarily aluminum carbide and aluminum oxide, out of the mill. The stream of gas carrying the solid comminuted material and leaving the ball mill passes through a cyclone and subsequently arranged filter so as to precipitate thereon and thus recover the solid particles.

The thus recovered solid particles may be reintroduced into the process or, for instance, may be further processed by reaction with an aluminum trihalide in a manner known per se.

Liquid metallic aluminum is retained in the ball mill and is removed therefrom either continuously or intermittently, for instance through a tap hole or into a suction crucible. The thus obtained aluminum melt may then be subjected in conventional manner to further refining in order to remove residual impurities and dissolved aluminum carbide therefrom.

The grinding of the reaction product and the separation of comminuted solid materials from the molten metallic aluminum is to be carried out at a temperature above the melting point of aluminum, but preferably below 1800° C. in order to prevent an excess dissolution of the aluminum carbide in the molten aluminum. At a temperature of 1800° C., the solubility of aluminum carbide in molten metallic aluminum equals about 3% by weight and this for practical purposes, would appear to be the maximum amount of aluminum carbide that should be retained in the molten aluminum. In other words, considering the initial aluminum carbide content of the reaction product, up to temperatures of 1800° C. the amount or proportion of the aluminum carbide which is removed from the molten aluminum by passage of the inert gas stream therethrough will still be sufficient to make the process worthwhile. Since the reaction product is produced by melting together aluminum oxide-containing and carbonaceous material at temperatures considerably higher than 1800° C., it is desirable to cool the reaction product at least to 1800° C. prior to introduction of the same into the comminuting device such as a ball mill.

On the other hand, it is desirable to introduce the reaction product into the ball mill at a sufficiently high temperature so that during the grinding operation the temperature will remain above the melting point of aluminum without requiring the introduction of heat from an outside source. Nevertheless, should it become necessary, it is of course also possible to heat the ball mill or the like, for instance by means of conventional electric heating devices, in order to assure that the temperature within the ball mill will remain above the melting point of aluminum.

As pointed out above, the reaction product which forms the starting material for the process of the present invention may be produced in various ways and with various proportions of aluminum oxide and carbon and, consequently, the three main constituents of the reaction product, namely metallic aluminum, aluminum carbide and a residue consisting predominantly of aluminum oxide, may be present in the reaction product in greatly varying proportions.

However, generally, it is preferred to work up, in accordance with the present invention, reaction products of the following compositions:

|  | Percent by Weight | | |
| --- | --- | --- | --- |
|  | Maximum | Preferred | Minimum |
| Metallic aluminum | 80 | 74 | 20 |
| Aluminum carbide | 70 | 24 | 15 |
| Residue | 20 | 2 | 0.5 |

Generally, the more intimate the intergrowth of the constituents of the reaction product, the smaller should be the particle size of the comminuted solid constituents of the reaction product, i.e., of the aluminum carbide and aluminum oxide. In the case of a very intimate intergrowth, it is generally advantageous to arrange downstream of the grinding device in the flow of inert gas an air separator wherein solid particles having a size above 0.1 mm. are separated from the gas stream, and to reintroduce the thus separated coarser particles into the grinding device.

EXAMPLE II

A reaction product of the type described above and consisting of 74% by weight of metallic aluminum, 24% by weight of aluminum carbide and 2% by weight of residual constituents, predominantly aluminum oxide, is cooled to about 1200° C. and is introduced at this temperature in the form of coarse particles into a ball mill containing corundum spheres as grinding elements and having inner walls which are clad with corundum so that the molten metallic aluminum of the reaction product will come into contact only with corundum walls and grinding elements. In the ball mill further cooling of the reaction product takes place down to about 800° C.

The reaction product is ground until all of the aluminum carbide particles have a size below 1 mm. and preferably below 0.5 mm. During the grinding, argon is blown into the ball mill at a speed of more than 18 meters per second so that the stream of argon leaving the ball mill will carry along the finely ground solid constituents of the reaction product. These carried along, finely ground solid constituents are then separated from the gas stream in a cyclone arranged downstream of the grinding mill. The molten metallic aluminum is retained in the mill and is withdrawn therefrom through a special tape hole.

The solid particles which are separated in the cyclone consist of about 79% by weight aluminum carbide, 12% by weight aluminum and about 9% by weight of residual constituents, predominantly aluminum oxide.

The liquid aluminum which is retained in the mill and separately withdrawn therefrom in molten form, contains as impurities about 4.5% by weight of aluminum carbide and aluminum oxide. These residual impurities may be eliminated by conventional refining processes, for instance by treatment with halide salts.

EXAMPLE III

By proceeding in the manner described in Example II, however utilizing a reaction product consisting of 51.6% by weight aluminum, 38.7% by weight aluminum carbide and 9.7% by weight residual constituents (predominantly aluminum oxide), 47% by weight of liquid aluminum composed of 94.5% by weight aluminum, 2.3% by weight aluminum carbide and 3.2% by weight of residual constituents; and 57% by weight of finely comminuted solid constituents consisting of 20.7% by weight aluminum, 64.4% by weight aluminum carbide and 14.9% by weight of residual constituents are obtained.

EXAMPLE IV

The process of Example II is repeated with a reaction product consisting of 73.4% by weight aluminum, 23.2% by weight aluminum carbide and 3.4% residual constituents.

71% by weight of molten aluminum having a composition of 95.5% by weight aluminum, 1.6% by weight aluminum carbide and 2.9% by weight residual constituents, predominatly aluminum oxide, are obtained as well as 29% by weight of finely comminuted solid material having a composition of 16.0% by weight metallic aluminum, 65.7% by weight aluminum carbide and 18.3% by weight of residual constituents, predominantly aluminum oxide.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of recovering aluminum from the reaction product obtained by melting alumina-containing material with carbonaceous material, said reaction product consisting essentially of a mixture of metallic aluminum, aluminum carbide and alumina, the steps of grinding said mixture at a temperature above the melting point of aluminum and below about 1800° C., at which temperature said aluminum will be liquid and said aluminum carbide and alumina will be in solid form, so as to comminute said aluminum carbide and said alumina; and blowing through the thus formed mixture of comminuted aluminum carbide, comminuated alumina and liquid aluminum at a temperature above the melting point of aluminum a stream of gas which is inert with respect to said aluminum, in such a manner as to substantially carry along in said gas stream said solid comminuted alumina and aluminum carbide and thereby to separate the molten aluminum from the solid constituents of said mixture.

2. A method of recovering aluminum, as defined in claim 1, wherein said inert gas is selected from the group consisting of argon, nitrogen and hydrogen.

3. A method of recovering aluminum, as defined in claim 1, wherein said solid constituents of said mixture are ground to a particle size below 1 mm.

4. A method of recovering aluminum, as defined in claim 1, wherein said solid constituents of said mixture are ground to a particle size of between about 0.5 and 0.1 mm.

5. A method of recovering aluminum, as defined in claim 1, wherein said reaction product consists essentially of between 20 and 80% by weight of metallic aluminum, between 15 and 70% by weight of aluminum carbide, and between about 0.5 and 20% by weight of a residue consisting predominantly of alumina.

6. A method of recovering aluminum, as defined in claim 1, wherein said reaction product consists essentially of about 74% by weight of metallic aluminum, about 24% by weight of aluminum carbide and about 2% by weight of a residue consisting predominantly of alumina, and wherein said gas is argon.

7. A method of recovering aluminum, as defined in claim 1, wherein said grinding and said blowing through of inert gas are carried out at substantially the same temperature.

8. A method of recovering aluminum, as defined in claim 1, wherein said blowing of a gas through said mixture is carried out simultaneously with the grinding thereof.

9. A method of recovering aluminum, as defined in claim 8, and including the step of recovering said solid comminuted constituents from said gas stream after the latter has passed through said reaction mixture.

10. A method of recovering aluminum as defined in claim 8, wherein said solid constituents are ground to a particle size of between about 0.5 and 0.1 mm.

References Cited
UNITED STATES PATENTS

| | | | |
|---|---|---|---|
| 1,810,801 | 6/1931 | Todt | 75—68 X |
| 1,845,694 | 2/1932 | Wood | 75—93 |
| 2,160,812 | 6/1939 | Alden et al. | 75—68 |
| 3,068,092 | 12/1962 | Menegoz | 75—68 |
| 3,087,808 | 4/1963 | Gottschalk | 75—68 |
| 3,186,832 | 6/1965 | Sparwald | 75—68 |

L. DEWAYNE RUTLEDGE, *Primary Examiner.*

H. W. TARRING, *Assistant Examiner.*